March 21, 1961 C. K. BIRDSALL ET AL 2,976,455

HIGH FREQUENCY ENERGY INTERCHANGE DEVICE

Filed March 19, 1958 4 Sheets-Sheet 1

CHARLES K. BIRDSALL &
WARD A. HARMAN
INVENTORS

BY *[signature]*

ATTORNEY

HIGH FREQUENCY ENERGY INTERCHANGE DEVICE

CHARLES K. BIRDSALL &
WARD A. HARMAN
INVENTORS
BY [signature]
ATTORNEY

March 21, 1961 C. K. BIRDSALL ET AL 2,976,455

HIGH FREQUENCY ENERGY INTERCHANGE DEVICE

Filed March 19, 1958 4 Sheets-Sheet 3

CHARLES K. BIRDSALL &
WARD A. HARMAN
INVENTORS

BY Urban H. Faubion

ATTORNEY

CHARLES K. BIRDSALL &
WARD A. HARMAN
INVENTORS

BY

ATTORNEY 2,976,455

HIGH FREQUENCY ENERGY INTERCHANGE DEVICE

Charles K. Birdsall, Menlo Park, and Ward A. Harman, Palo Alto, Calif., assignors to General Electric Company, a corporation of New York Filed Mar. 19, 1958, Ser. No. 722,404

14 Claims. (Cl. 315—3.6)

This invention relates to the class of devices which depend upon an interchange of energy between a stream of electrons and electromagnetic waves produced by a radio frequency field to provide for generation or amplification of high-frequency electrical waves. More particularly, the invention relates to such devices wherein the interchange of energy is dependent upon three dimensional movement of electrons in a region containing electromagnetic waves.

It is well known that amplification and oscillation production in the microwave frequency spectrum may be achieved by an interchange of energy between an electron stream and electromagnetic field produced by a radio frequency wave propagated along a suitable transmission path at approximately the same velocity as that of the electrons in the electron stream. The commonly encountered modes of operation are described in an article by Rudolf G. E. Hutter, entitled, "Traveling-Wave Tubes," which appears in Advances in Electronics and Electron Physics, Vol. 6, 1954. The Hutter article includes a description of the various traveling wave type energy interchange devices to which the present invention is directed. Consequently, all of the various types of traveling wave interaction mechanisms is not described in detail herein. However, since the present invention has the advantages normally associated with the conventional traveling wave tubes commonly referred to as the O-type, and traveling wave magnetron tubes, (the M-type) and further, since the interaction of the device of the present invention most closely resembles the traveling wave tube of the M-type (the traveling wave magnetrons) both of these devices are discussed in some detail.

As described in the Hutter article, supra, for energy interchange to take place in a traveling wave tube in any appreciable amount, two conditions must be met: (1) the electron stream must pass through a region containing the radio frequency field (commonly called the region of interaction), and (2) the velocity of electrons in the electron stream must be at least of the same order of magnitude as the phase velocity of a component of the radio frequency field in the direction of travel of the electron stream in the region of interaction.

In order to meet the conditions for energy interchange, the traveling wave tubes of both the M-type and the O-type include an electron gun for producing a stream of electrons in the interaction region and a radio frequency circuit for producing the required radio frequency electromagnetic field in the region of interaction. The speed of electrons in an electron stream produced by such a gun depends upon the accelerating voltage applied to the gun. In general, the speed of electrons from such guns is much less than the speed of light. For example, the speed of electrons from a gun utilizing an accelerating voltage of 2,500 volts is approximately 1/10 the speed of light, and the speed of electrons from a gun utilizing an accelerating voltage of 80,000 volts is approximately one-half the speed of light. Since current travels along a conductor at approximately the speed of light and its associated electric and magnetic fields propagate at the same speed, some means must be provided either to increase the velocity of the electrons in the stream or to reduce the speed of propagation of the radio frequency wave in the direction of flow of the electron stream if the second condition for energy interchange set forth above is to be met. In both the case of the M-type device and the O-type device, a transmission line of the "slow wave" type is provided for the radio frequency waves in order to reduce the speed of a component of the electromagnetic waves propagated along the slow wave circuit in the direction of the electron stream as required.

In the conventional O-type device an electron stream is projected along the slow wave circuit in such a manner that the electrons in the stream and the radio frequency field produced by the slow wave circuit travel in close proximity. The average velocity of electrons in the stream is made substantially equal to or synchronous with the axial component of the wave velocity along the slow wave circuit. In operation, a wave traveling along the transmission line interacts with the electrons in the stream in such a manner as to alternately increase and reduce the instantaneously velocity of electrons in the stream thereby to cause a redistribution in the form of a partial bunching of electrons along the stream. As the wave and stream travel along the slow wave circuit, the inverse phenomenon occurs, and the bunched stream induces fields and currents in the slow wave circuit. The amplitude of the radio frequency wave increases along the circuit because the electron stream gives up more energy to the slow wave circuit than it abstracts from it. Consequently, an amplification of the radio frequency wave on the slow wave circuit takes place.

The conventional O-type traveling wave tube depends upon the energy interchange caused by the bunching of electrons along the stream, as described above, to produce amplification or oscillation. Since the energy interchange mechanism is dependent almost entirely upon redistribution of electrons axially along the stream, the O-type interaction is considered to take place in one dimension, i.e., the axial dimension.

Attributes generally associated with O-type traveling wave tubes include operation over an extremely broad band of frequencies, a high rate of gain when used as amplifiers, and high power handling capabilities. The power handling capabilities result in large measure from the fact that the circuit is not a collector for electrons from the stream. A separate electrode is provided which dissipates residual energy in the electron stream.

In the conventional M-type traveling wave magnetron device, a generally planar rectangular slow wave circuit or transmission line and a correspondingly planar, rectangular, conductive sole plate or electrode are spaced apart in parallel relationship. The space between the parallel circuit and sole constitutes the interaction region. An electron gun is positioned at one end of this structure to direct an electron stream through the interaction region and amplification or generation of oscillations is obtained by interaction between the electron stream and the electromagnetic waves produced in the interaction region by the slow wave transmission line. However, this interaction takes place in a time constant electric field which has lines of force at right angles (transverse) to the direction of electron flow (the direction of propagation of the electromagnetic wave introduced in the interaction region) and a time constant magnetic field having its lines of force at right angles to both the direction of the electron stream and the lines of force of the time constant electric field. Thus, the electric and magnetic fields are described as "crossed" fields. The time constant electric field is established by providing a unidirectional potential between the slow wave circuit and the electrode or sole plate on opposite sides of the interaction region, and the magnetic field may be produced by any of a number of well known means such as by magnets on opposite sides of the interaction region.

As previously indicated, the electron stream and the electromagnetic waves propagated through the interaction region should have approximately the same velocity for interaction to take place in any appreciable amount. As described in connection with the O-type interaction, electrons in the stream are alternately accelerated and decelerated by the radio frequency electromagnetic field as they move axially down the interaction region. Thus, bunches of electrons are formed. However, the radio frequency wave gains energy from the electric field between the slow wave circuit and sole plate by the interaction mechanism said to take place in the dimension along the electric field, i.e., the dimension perpendicular to the dimension in which the O-type interaction takes place.

An understanding of this interaction mechanism may be had by considering the action of electrons from the electron stream which are introduced into the interaction region and directed axially down the interaction region by a given accelerating voltage. In the absence of a radio frequency field in the interaction region, the electrons travel down the full length of the device along a path determined by the accelerating voltage of the electrons in the stream and the potentials applied to the slow wave structure and the sole plate. When a radio frequency field is applied, electrons are alternately accelerated and decelerated by the radio frequency field. This disturbs the equilibrium of forces produced on the electrons by the unidirectional electric and magnetic fields in such a manner that the electron stream drifts toward the higher potential slow wave circuit. Electrons which transfer energy to the electromagnetic wave move through successively higher unidirectional potentials until they impinge on the slow wave circuit. In some magnetrons, as much as 20 percent of electrons in the injected stream are incident upon the first few segments of the slow wave structure, thus requiring extraordinary heat dissipation capabilities for these segments.

Nearly all of the remainder of the electron stream current is collected by remaining segments of the slow wave structure. As a result, slow wave structures employed in such traveling wave magnetrons are very susceptible to being destroyed by heat. For this reason, thermal design often takes precedence over electrical design at the expense of electrical efficiency.

The M-type device is characterized by a high efficiency and generally by the collection of electrons from the electron stream on the slow wave circuit. Various means have been utilized to avoid collecting the electron stream on the slow wave circuit, such as the use of separate collectors. However, these expedients generally result in a reduction of efficiency of the apparatus.

M-type traveling wave magnetron oscillators and amplifiers, when operating at frequencies above 10,000 megacycles and at average powers in the 100 watt range, require an electron stream with a prohibitively high current density and a slow wave circuit having correspondingly high heat dissipating capabilities. As the desired frequency of operation for the device increases (wave-length decreases), the physical dimensions of the slow wave structure must be reduced in direct relation to the decrease in wave length. The smaller slow wave structures result in a reduction of maximum allowable power output of the device. Thus, scaling the electron stream and slow wave structure to higher frequencies and higher powers presents difficulties generally considered insurmountable, and in most cases, direct scaling attempts have not been practical.

The apparatus of the present invention retains the high efficiency possibilities of the M-type devices while overcoming the above-mentioned limitations imposed by the use of slow wave structures positioned in such a manner that they collect electrons from the stream. This important feature results from the use of a new energy interaction mechanism which allows a separate collector of electrons to be used without interfering with the efficiency of the apparatus. With the collector of the electrons from the electron stream separated from the slow wave circuit, the heat dissipation capabilities of the collector may be increased many fold since it does not have to be as delicate in construction as slow wave circuits and it is not limited in size by electrical design considerations. Further, such a collector may be cooled by well known techniques which are not available for cooling slow wave circuits of the type under consideration.

An additional problem arises when magnetrons are employed as backward-wave oscillators and anode-to-cathode oscillators. That is, the anode-to-cathode power supply must provide both the direct current power for operation and the potential difference which controls the output frequency. Therefore, a high power current and voltage supply is needed. Such supplies require complicated current and voltage regulating circuitry.

An electron stream interacts strongest with the electromagnetic field produced by radio frequency waves on slow wave structure when the stream travels in close proximity to the slow wave structure. In other words, the rate of growth of the radio frequency wave on a slow wave structure (the gain) is greater when the path of the electron stream is close to the slow wave structure. This is due to the fact that the radio frequency field existing along a slow wave structure decays exponentially as a function of the distance from the structure, and decays to zero at the sole or reference electrode. However, a maximum energy transfer from the electric field to the radio frequency wave on the slow wave circuit and a maximum efficiency results when the electron stream is introduced into the interaction region near the reference electrode or sole plate. That is to say, that maximum efficiency and energy transfer from the electric field to the radio frequency wave on the slow wave circuit occurs when the electron stream enters the interaction region at a potential very near the potential of the reference electrode and moves progressively through the higher potential regions to the collector (which establishes the high potential value) as it passes through the interaction region. These facts present the frustrating engineering problem when designing M-type devices of compromising between efficiency and gain.

Another somewhat related problem is that the initial position of entry of the electron stream into the interaction region, i.e., its position relative to the reference electrode and slow wave circuit, is determined by its accelerating potential and hence its velocity. The velocity of the electrons in the stream in turn dictates the pitch of a helical slow wave circuit for the reasons previously given in connection with the relative velocities of the electron stream and electromagnetic waves propagated axially along the interaction region. When the electron stream enters the interaction region at a relatively low potential (low velocity) and hence near the reference electrode, the pitch of the slow wave structure must be very small; consequently, the slow wave structure itself must be small and delicate and heat dissipation problems arise. Thus another compromise must be made due to the fact that the slow wave structure in an M-type traveling wave tube designed for high efficiency places a limitation on power handling capabilities.

Accordingly, it is one object of the present invention to provide high frequency energy interchange apparatus for producing or amplifying electromagnetic waves in the microwave region.

It is another object of this invention to provide a high frequency energy interchange device of the cross-field type for operation at high power levels and high frequencies.

Another object of the present invention is to provide such a device in which the slow wave structure does not collect electrons in any substantial amount.

Still a further object of the present invention is to provide such a device which is capable of operating at high powers and high efficiency while also operating in the high frequency region.

In carrying out the present invention, a high frequency energy interchange device is provided wherein an electromagnetic wave is produced in an interaction region containing electric and magnetic fields which are perpendicular to each other and the axis of the interaction region. A stream of electrons is directed down the interaction region at an average velocity which is greater than the velocity of the axis component of electromagnetic waves therein, whereby interaction takes place between the electron stream and electromagnetic wave. The elements of the device are so oriented that movement of electrons in all dimensions within the interaction region contributes to the interaction process.

The novel features which are believed to be characteristic of this invention are specifically set forth in the appended claims. The invention itself however, both as to its organization and method of operation together with further objects and advantages thereof may best be understood by reference to the following description taken in connection with the accompanying drawings in which:

Figures 1, 2:
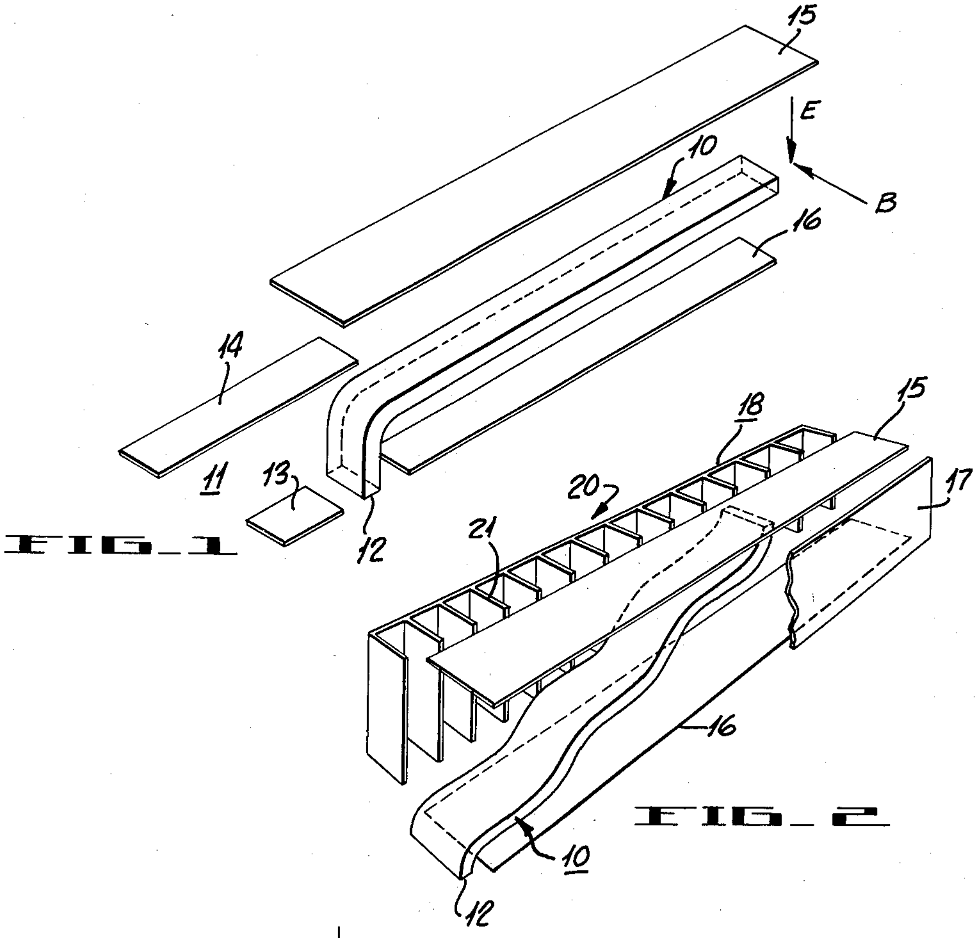
Figure 1 is a schematic exploded view of a model utilized in describing the operation of the present invention.
Figure 2 is an exploded view of a model illustrating a basic configuration of appartus constructed in accordance with teachings of the present invention.

The simplified model of the high frequency energy interchange device illustrated in Figure 1 shows the relative orientation of essential component parts of a high frequency energy interchange device of the type to which the present invention is directed. A sheet of electrons 10 is formed by a conventional electron gun 11 which includes an electron emissive cathode member 12 and two spaced apart electron stream forming and directing electrodes 13 and 14. The electron gun is designed to direct the stream of electrons through an interaction region between a pair of substantially planar rectangular plates or electrodes 15 and 16 of conducting material, which occupy spaced apart parallel planes. One of the electrodes, i.e., the upper electrode 15, is referred to as the collector since it serves to collect electrons from the stream 10 when the device is in operation and the lower electrode 16 is referred to as the sole or reference electrode. The region between the collector 15 and reference electrode 16 is called the interaction region due to the fact that it constitutes the region wherein an exchange of energy, or interaction, takes place between the electron stream and electromagnetic waves.

An electric field is established between the collector and sole plates 15 and 16 by providing a unidirectional potential difference between them. Usually, the sole plate 16 is placed at ground or reference potential and the collector 15 at some voltage which is positive with respect to the reference potential. Thus, an electric field is established between the two electrodes 15 and 16 which, according to convention, has lines of force perpendicular to both electrodes and in the direction from the positive collector plate 15 toward the sole plate 16, as indicated by the arrow marked E in Figure 1.

It is well known that such an electric field E produces a force on electrons passing therethrough which force is toward the collector plate 15. Therefore, if no other forces were present to act on the electrons in the electron stream 10, they would leave the cathode 12, enter the interaction region, and be deflected upward toward the collector plate 15. In the model shown, it is most desirable to provide an equilibrium condition whereby a sheet of electrons from the cathode 12 is directed down the interaction region without intercepting either the collector 15 or sole plate 16 unless a radio frequency electromagnetic wave is introduced in the interaction region. In order to produce such a condition, a magnetic field is established in the interaction region which has lines of force in a direction perpendicular to the electric field E and also perpendicular to the longitudinal axis of the interaction region of the structure.

The equilibrium condition for the electrons in the stream is provided by producing a magnetic field with lines of force directed into the paper as indicated by the arrow B in Figure 1. Since an electron moving normal to a magnetic field experiences a force perpendicular to the field and also normal to the direction of motion in accordance with Fleming's right hand rule, the resultant force produced on an individual electron passing through such a magnetic field is such as to move the electron toward the sole plate 16. The magnitudes of the magnetic field B and the electric field E are preferably adjusted so that the force produced on electrons passing axially down the interaction region by each is precisely equal.

Since forces produced by the electric and magnetic fields E and B are normal to the surfaces of the collector and sole plates and equal and opposite in direction, electrons from the cathode member 12 may pass throughout the length of the interaction region without being deflected. Regardless of whether or not a radio frequency field is applied, the "crossed" electric and magnetic fields have the advantage of acting upon the electrons in the stream to offset the spreading effect of space charge.

The apparatus described thus far does not differ materially from the ordinary M-type traveling wave magnetrons. The principal difference between the structure of M-type traveling wave devices and the structure necessary to support the new type of interaction mechanism described herein may best be seen by reference to the apparatus illustrated in Figure 2. The model illustrated in Figure 2 is almost identical to that of Figure 1 but has two major components which are not present in the model of Figure 1. The first component is illustrated as being a rectangular plate or electrode 17, which may be a sheet of conductive material similar to the sole and collector plates 15 and 16. This plate 17, as illustrated, extends along the front side of the interaction region and occupies a plane perpendicular to the sole and collector plates 15 and 16. The second component which has been added is a transmission line 18 of the type generally referred to as a slow wave circuit. The slow wave circuit 18 illustrated consists of a substantially flat back plate 20 which extends along one side of the interaction region parallel to the conductive plate 17 and plurality of planar fins 21, which are spaced apart, are perpendicular to the flat back plate 20, and extend inwardly toward the interaction region. The slow wave structure utilized is not crucial to this invention and may for example be any one of a number of interdigital, periodically loaded, or helical type slow wave circuits. The particular slow wave structure illustrated is known as a single finned structure and is described and illustrated on pages 21 through 59 of the book, Traveling-Wave Tubes, by J. R. Pierce, Van Nostrand Co., Inc., New York (1950). The flat side plate 17 in combination with the slow wave circuit 18 may be considered as the radio frequency circuit. The unidirectional potentials applied to these circuit elements are discussed in detail subsequently.

Thus, the principal structural difference between the present energy interchange device and conventional traveling wave magnetrons is that the slow wave circuit of the traveling wave magnetron occupies the position of the collector 15 of Figures 1 and 2, and acts as the radio frequency circuit as well as collector of electrons whereas the slow wave circuit 18 in the present device is displaced to one side of the interaction region so that it is in a plane perpendicular to the magnetic field and is not intercepted by electrons from the stream in any appreciable amount. The more important operating or functional difference is described more fully below.

When a radio frequency electromagnetic field is introduced into the interaction region by propagating a radio frequency wave along the slow wave structure 18, the equilibrium of the electron stream is disturbed and energy is imparted to the radio frequency wave by the electron stream.

The mechanism by which energy is transferred from the electron stream to the radio frequency wave is considered below from two different standpoints in order to develop an understanding of the best known theory of operation of the mechanism. First, the operation of the apparatus is considered in terms of groups of electrons in the electron stream and later the mechanism is explained in terms of individual electron trajectories or paths in the stream. When considering operation from the standpoint of collective groups of electrons in the electron streams, the gain mechanism may be considered as three separate but intimately related interactions. The combination of these interactions make up the new type of interaction. The separate interactions as discussed are as follows:

(1) M-type interaction
(2) O-type interaction
(3) Transverse interaction (along the magnetic field lines B)

The first type of interaction is generally considered to be an M-type interaction because it is the interaction which occurs in M-type devices. Interaction results from abstraction of potential energy from the unidirectional electric field by the electron stream as electrons in the stream are moved upward toward the collector in a transfer of a portion of the energy so gained to the radio frequency wave. This interaction depends upon movement of electrons in the stream from their initial position near the sole plate toward the collector plate in the vertical direction. The process does not abstract net kinetic energy from the stream and the stream remains focused. This type of interaction is most effective when the average electron velocity is equal to the axial component of the velocity of electromagnetic waves in the interaction region. The movement of the electron stream just described can be explained in terms of the forces produced by the crossed electric and magnetic fields E and B, respectively, in the interaction region. For example, the electrons in the electron stream are free to move in three dimensions or directions. They move longitudinally along the axis of the apparatus and electrons in the stream are either accelerated or decelerated by the radio frequency field depending upon their position with respect to this field and the equilibrium condition initially set up or produced by the crossed magnetic and electric fields B and E is upset. Since the force on electrons in a magnetic field is directly dependent upon their velocity, the force exerted on decelerated electrons by the electric field exceeds that exerted by the magnetic field and the decelerated electrons move in the vertical direction from the sole 16 toward the collector plate 15 to a region of higher potential. Thus, the electrons abstracts or gain potential energy from the unidirectional field E and deliver energy to the radio frequency field as they move toward the collector to the region of higher potential. As electrons move upward, their instantaneous velocity is increased so that they maintain their average axial velocity and capability of delivering energy as they travel down the interaction region until they intercept the collector 15.

Simultaneously with the electron movement described above, motion of electrons may also occur along the magnetic field B, that is, in a direction perpendicular to both the electric field and the longitudinal axis of the device, but this movement or motion is not essential to the operation of the ordinary M-type device and, as far as is presently known, does not contribute materially to the transfer of energy between the electron stream and the collector or slow wave circuit of an M-type traveling wave tube.

The second type of interaction occurs as a result of redistribution of electrons in the stream in the axial direction. This type of interaction is commonly referred to as the O-type interaction since it is the principal interaction mechanism in the O-type traveling wave tube. This type of interaction is characterized by the fact that as the electrons in the electron stream move axially along the interaction region, the electrons in the stream are alternately accelerated and decelerated in such a manner that bunches of electrons are formed. These electron bunches move along the stream 10 at an average velocity equal to that of the stream as determined by the accelerating voltage. If this average velocity exceeds that of the electromagnetic waves propagated down the interaction region, the radio frequency field abstracts more energy from the electron stream than it gives up to the electron stream. Thus, the radio frequency wave on the slow wave structure 18 grows as it travels down the interaction region.

The third type of interaction involves an exchange of energy due to movement of electrons in a direction which is normal or transverse to both the direction of movement of the stream (along the interaction region) and the lines of force of the electric field E. In other words, this type of interaction depends upon movement of electrons in the direction of the lines of force of the magnetic field B. Further, if the net energy transfer in this type of interaction is to be from the electron stream to the electromagnetic wave, the electrons in the stream should be moving down the interaction region at an average velocity which is greater than that of the axial component of the electromagnetic wave.

When the electron stream 10 is injected into the interaction region in the presence of a radio frequency wave and near the sole 16, it is deflected toward and away from the slow wave circuit 18 and toward the collector 15 by the radio frequency field. Thus, the entire electron stream 10 has a stepped and snaking appearance as it moves from side to side and rises in the interaction region. The orientation of the electric and magnetic field E and B is such that the electron stream is near the slow wave circuit 18 when the radio frequency field introduced into the region is of a phase to abstract energy and away from the slow wave circuit 18 when the fields are of a phase to abstract energy from the electron stream. Since the radio frequency field is greatest near the circuit and diminishes very rapidly (exponentially) with distance from the circuit, the stream 10 gives up more energy to the radio frequency field than it receives therefrom. This aspect of interaction is aided by the fact that the relative velocities of the electrons and electromagnetic waves is such that the electrons are in a bunched condition when near the slow wave circuit 18.

From the foregoing discussion it is seen that the new interaction is similar to both the O-type and M-type interaction in some respects but differs from each. The interaction mechanism is similar to that of the M-type traveling wave tube in that the electrons in the stream drift toward a collector plate to a region of higher potential, maintaining their drift velocity and capability of delivering energy until collected on the collector 15. The interaction mechanism of the device of the present invention is similar to the O-type interaction in that the electrons in the stream are bunched by the radio frequency fields and the electrons must have a velocity which is greater than that of the axial component of the electromagnetic waves in the interaction region, if the conditions described above are to be met. However, the new interaction mechanism is different from both of these interaction mechanisms due to the fact that it depends upon movement of the electrons in the stream toward and away from the slow wave circuit 18 to cause the radio frequency electromagnetic waves to grow.

When the electrons are injected into the interaction region at a velocity equal to the axial component of the velocity of propagation of the electromagnetic waves through the interaction region (called the synchronous velocity), there is substantially no energy exchanged between the electromagnetic waves and the electron stream for the model illustrated in the figures thus far described. At least, there are no first order effects. In practice some energy interchange does take place and when the configuration of the tube is changed or altered or if the circuit shape is altered, some energy interchage also takes place.

When electrons in the stream move down the interaction region at a velocity less than the velocity of propagation of the electromagnetic waves, the electrons tend to move toward the sole 17 and take energy from the radio frequency wave so that the wave diminishes in amplitude along the length of the interaction region. At velocities much above or below synchronism there can be little or no stream deflection toward or away from the slow wave circuit 18.

Figure 3:
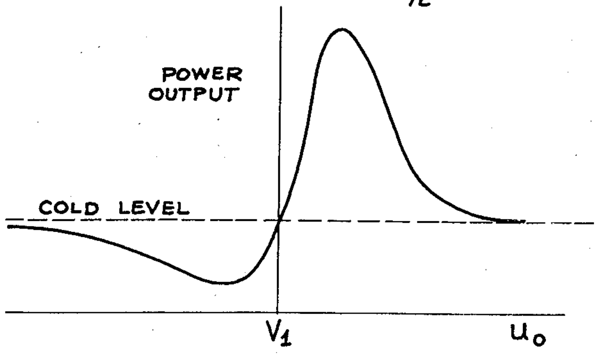
Figure 3 is a graph utilized in explaining the operation of the device and illustrating the gain of the device as a function of electron stream velocity and velocity of propagation of radio frequency electromagnetic waves down the interaction region.

Figure 3 illustrates the relationship of the output or gain of the energy interchange apparatus as a function of the velocity of the electron stream $u_0$ (usually expressed in volts). In this figure the velocity $u_0$ of the electron stream 10 is plotted along the axis of ordinates and the power output of the device is plotted along the axis of the abscissa. The broken line labeled Cold Level shows the power output when there is no electron stream in the device. The vertical axis marked $V_1$ indicates the synchronous velocity of the stream. That is, velocity $V_1$ is the stream which is equal to the velocity of propagation of the axial component of the electromagnetic wave. Notice that for this condition there is no appreciable increase in power output over the cold level. As indicated in the description above, the figure shows that with electrons in the stream moving at velocities below synchronous velocity $V_1$, the output power is actually less than the cold level, and above synchronism the output power is greater than the cold level power.

Another way to analyse the interaction mechanism of the device is to consider individual electron trajectories. Utilizing this method of describing the energy interchange mechanism, it is necessary to show that the energy given to the radio frequency wave by electrons in the stream exceeds that accepted by electrons in order to obtain a net energy transfer. In other words, it is necessary to show that the energy given up by the individual electrons to the radio frequency field as the electrons are decelerated exceeds that extracted from the electron stream by the radio frequency field when electrons in the stream are being accelerated.

Figure 4:
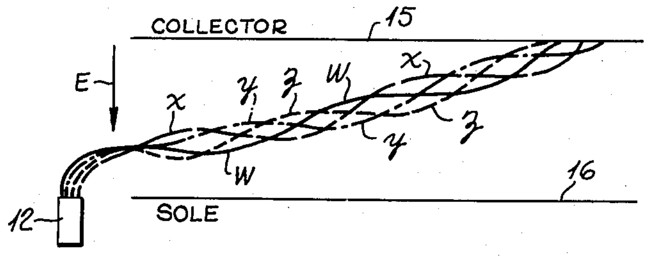
Figure 4 is a side elevational view of a model of part of an energy interchange device constructed in accordance with the present invention illustrating electron trajectories.

Individual electron trajectories are illustrated by the movement of the individual electrons *w*, *x*, *y* and *z* in Figures 4 through 7, inclusive, of the drawings. In Figure 4 a filamentary electron stream consisting of the four electrons *w*, *x*, *y* and *z* is shown. In order to distinguish individual electron paths, the paths of the individual electrons are designated by different type lines. For example, the path of electron *w* is a solid line, while the paths of electrons *x*, *y* and *z* are shown as various kinds of broken lines. The electrons are shown to have a clockwise spiral or corkscrew motion from the cathode 12 axially down the length of the interaction region and upward toward the collector plate 15.

Figure 5:
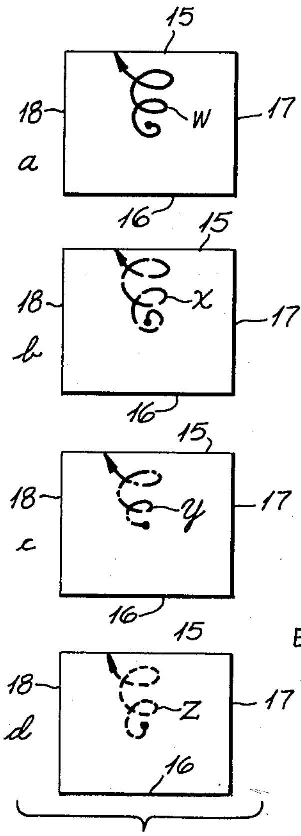
Figure 5 is a series of four end views of the apparatus of Figure 4 showing individual electron trajectories.
Figure 6:
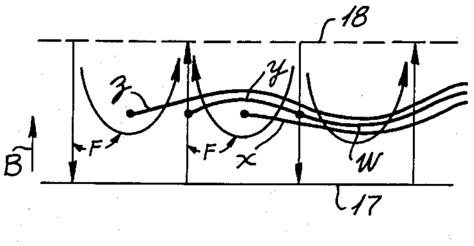
Figures 6 and 7 are enlarged plan and side views respectively of a portion of the model of Figure 4 which views are utilized in described individual electron trajectories.
Figure 7:
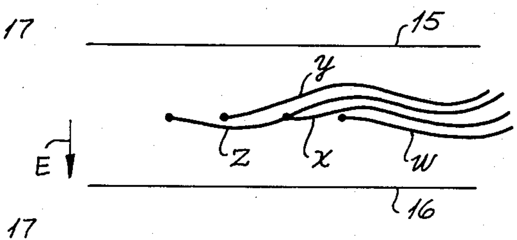

The reason for the clockwise spiral motion of the individual electrons *w*, *x*, *y* and *z* may be most clearly seen from the views of Figures 5, 6 and 7. The motion of the sample electrons selected for analysis are chosen at various points along the length of the interaction region (i.e., injected at different times), as shown in the plan view of Figure 6 and the side elevation of Figure 7 in order to demonstrate how all electrons which rise in the interaction region give up energy to the electromagnetic wave. Notice that the electric and magnetic fields E and B, respectively, are illustrated in these figures by arrows marked with these letters and the force on electrons due to the radio frequency field in the region is shown by the arrows marked F in Figure 6. Since the views of Figures 6 and 7 are taken with the electrons in the stream moving from left to right through the region, those force lines which are generally in a direction from left to right aid flow of electrons and are termed "accelerating fields" and those force lines of the radio frequency field which are in a direction from right to left decelerate electrons and are called "decelerating fields."

It is seen from Figure 6 that electrons moving down the interaction region alternately encounter accelerating and decelerating radio frequency electric fields. Between accelerating and decelerating fields there are regions where the electrons are either moved away from the slow wave circuit 18 or toward the slow wave circuit 18 by the radio frequency fields. For example, when an electron is moving from a region of accelerating fields into a region of decelerating fields, it is forced toward the slow wave circuit 18 and when an electron moves from a region of decelerating fields to accelerating fields, it experiences a force which is away from the slow wave circuit.

Electron *w*, the first electron whose trajectory is analysed, is an electron having an initial position midway between regions of accelerating and decelerating fields. Hence, electron *w* is subjected to a force by the radio frequency field which tends to move the electron away from the slow wave circuit 18. As electron *w* moves into the accelerating radio frequency field, it is subjected to forces which tend to move it away from the slow wave circuit 18 as well as accelerating forces. Since the magnetic field B produces a force on the electron which is proportional to the electron velocity, the downward force is increased due to the acceleration. Thus, electron $w$ is forced down toward the sole plate 16 under the influence of magnetic field B. Thus, electron $w$ moves down toward the sole plate 16 and away from the slow wave circuit 18 as it moves into the accelerating region. Once the electron has moved about half way through the accelerating region, it experiences a force due to the radio frequency field which tends to move it back toward the slow wave circuit 18. Therefore, during its passage through the region of accelerating radio frequency field, it moves away from the slow wave circuit and then back toward the slow wave circuit in a snake-like movement.

Electron $w$ then moves into the next region of decelerating radio frequency field. As the electron is decelerated, the force presented by the electric field E becomes greater than that produced by the magnetic field B and the net force on electron $w$ is upward toward the collector 15. Under the influence of this force, the electron moves upward as it continues to move forward through the decelerating region. This movement is best seen from Figure 5*a* which shows that the electron starts at a central location, moves to the right away from the slow wave circuit 18 and downward toward the sole plate 16 and then back to the left toward the slow wave circuit 18 and upward toward the collector 15 in a spiral fashion. It continues to move into alternate accelerating and decelerating fields and to be pushed from side to side in the interaction region in a fashion similar to that just described. As previously described, the effect of the radio frequency field on any electron is greatest when the electron is near the slow wave circuit due to the fact that the radio frequency field decays rapidly with distance away from the slow wave circuit 18. Therefore, the electron does not travel as far down toward the sole plate 16 in the accelerating phase as it travels up toward the collector 15 in the decelerating phase. The result is a tendency to enlarge the spiral of the electron trajectory; that is, to enlarge the radius of the spiral in a plane perpendicular to movement of the electron stream 10.

A consideration of the trajectory of electron $w$ just described reveals that it gains potential energy as it moves down the interaction region since it climbs toward the collector. Further, electron $w$ gives up more energy to the radio frequency wave than it abstracts therefrom since it is relatively near the slow wave circuit 18 when it is giving up energy from the radio frequency wave.

Electron $x$ of our sample is an electron which is approximately in the center of a region of a decelerating radio frequency field and on the central axis of the interaction region at the particular instant which we start the analysis. Being in the center of a decelerating field, electron $x$ experiences an upward force due to the net unbalance effect of the crossed electric and magnetic fields. As the electron $x$ moves upward and forward along the interaction region, it experiences forces due to the radio frequency field which tend to move it away from the slow wave circuit 18. The electron $x$ then moves into an accelerating radio frequency field which causes it simultaneously to move outward away from the slow wave circuit 18 and downward toward the sole plate 16. As it continues to move forward it moves into a region wherein the radio frequency field tends to move it toward the slow wave circuit so that it tends to move under and around its initial position as illustrated in Figure 5*b*. The electron $x$ then moves into a region of decelerating radio frequency field when it is traveling toward the slow wave circuit and therefore gives up energy to the radio frequency field, is decelerated and moves upward to accept energy from the electric field and continues to give up energy to the radio frequency field. Electron $x$ experiences the upward force as it is accelerated by the radio frequency field until it again moves into a region between the accelerating and decelerating radio frequency fields whereupon it is moved away from the slow wave circuit and continues to spiral. Since electron $x$ moves upward and is close to the slow wave circuit 18 when giving up energy to the radio frequency field and relatively remote from the slow wave circuit 18 while accepting energy from the radio frequency field there is a net transfer of energy from the electric field E to the radio frequency field via electron $x$.

Electron $y$ is one which is midway between accelerating and decelerating radio frequency fields and in a region where it is being forced toward the slow wave circuit at the time analysis of its trajectory begins. Thus, the initial movement of electron $y$ is toward the slow wave circuit. As it moves forward in the interaction region into a decelerating field, the force balance between the crossed electric and magnetic field E and B is upset due to deceleration and electron $y$ moves upward toward the collector 15. The electron $y$ then moves into the next region between accelerating and decelerating fields where it is forced away from the slow wave circuit 18 and then moves into the accelerating phase of the radio frequency field. In the accelerating phase, the equilibrium of forces between the crossed electric and magnetic field E and B is upset in such a way that the electron is moved downward toward the collector. Electron $y$, like electrons $w$ and $x$, meets all of the requirements for transferring more energy to the radio frequency field than it accepts therefrom.

In order to complete the sample of electrons from the stream, the trajectory of electron $z$ which is initially in the center of an accelerating phase of the radio frequency field is analyzed. Since electron $z$ starts precisely in the center of an accelerating phase, there is no movement away from the slow wave circuit 18 and it will move down toward sole 16 under the force of the magnetic field B and then move into the intermediate region between accelerating and decelerating phases where the net radio frequency force tends to push the electron $z$ toward the slow wave circuit 18. As the electron $z$ moves toward the slow wave circuit 18, it passes into a decelerating phase of the radio frequency and, due to the deceleration, starts to move upward under the influence of the electric field E until it passes through the decelerating phase whereupon it is moved outward away from the slow wave circuit 18 and moves into an accelerating phase. Therefore, electron $z$ spirals generally upward as it moves forward through the interaction region and meets all the requirements for a net transfer of energy to the radio frequency wave as described in connection with electrons $w$, $x$ and $y$.

Thus, the interaction mechanism whereby electrons in the electron stream transfer more energy to the radio frequency wave propagated down the interaction region than they accept from the radio frequency wave has been demonstrated both from an analysis of individual electron motion and on the basis of movement of the entire electron stream. A similar analysis can be utilized to show why the apparatus will not amplify appreciably when the average velocity $u_0$ of the electron stream is equal to the velocity $V_1$ of propagation of the electromagnetic waves down the interaction region. Such an analysis shows that electrons are deflected at all angles within the device and there is no tendency for the electrons to bunch. The number of electrons decelerated equals that accelerated and therefore, no energy is exchanged. In practice, some exchange of energy may occur with an extremely large wave on the slow wave circuit or when stream and circuit shapes are altered.

The same type of analysis of electron movement can be utilized to show that, when the electron stream 10 is injected into the interaction region at a velocity which is less than the velocity of propagation of the electromagnetic waves down the interaction region, the electrons tend to spiral down toward the sole 16 as they move down the interaction region so that the electromagnetic wave on the slow wave circuit actually diminishes as it moves down the interaction region.

The above results coincide with the actual observed conditions as plotted in Figure 3 of the drawings. This figure also indicates that there can be little stream deflection in the direction of the lines of force of the magnetic field B and therefore little net interaction at stream velocities much above or below synchronism. This phenomenon might be surmised just from the fact that the electromagnetic wave must be extremely strong to deflect electrons in the stream if the electrons are moving at a velocity which is much greater than that of the axial component of the electromagnetic wave in the interaction region and that the electrons in the stream will simply be scattered with little net effect on the electromagnetic wave when electrons in the stream are moving much slower than the velocity of propagation of the electromagnetic wave.

The models described thus far are diagrammatic and are utilized chiefly to show the principle of the interaction under consideration and the components required to obtain such interaction. Apparatus incorporating the principles described may take any number of forms. For example, the "plane" type structure illustrated may be made cylindrical without altering the basic principle of application or departing from the spirit of the invention. The cylindrical structures are not illustrated since making the device cylindrical is simply a space saving expedient familiar to those who have worked with conventional traveling wave magnetrons. The article "Magnetron-Type Traveling Wave Tube" by Warnecke, Kleen, Lerbs, Dohler and Huber which appears in the May 1950 issue of the Proceedings of the IRE starting at page 486 describes both the "plane" and "cylindrical" structures.

The device of Figure 2 may be wrapped up or made in a circular configuration in much the same manner as the conventional traveling wave type. In other words, the device may be wrapped in a cylindrical configuration with the sole plate 16 in the center of the device, the collector 15 around the outer periphery and the circuit at one end. The opposite arrangement is also practical. That is, the device may be wrapped up in a cylindrical configuration with the sole plate 16 and cathode member 12 around the outer periphery of the device and the collector 15 in the center. Further, the sole member 16 may itself be made the source of electrons. Such an arrangement may be particularly useful at millimeter wavelengths.

Figures 8, 9:
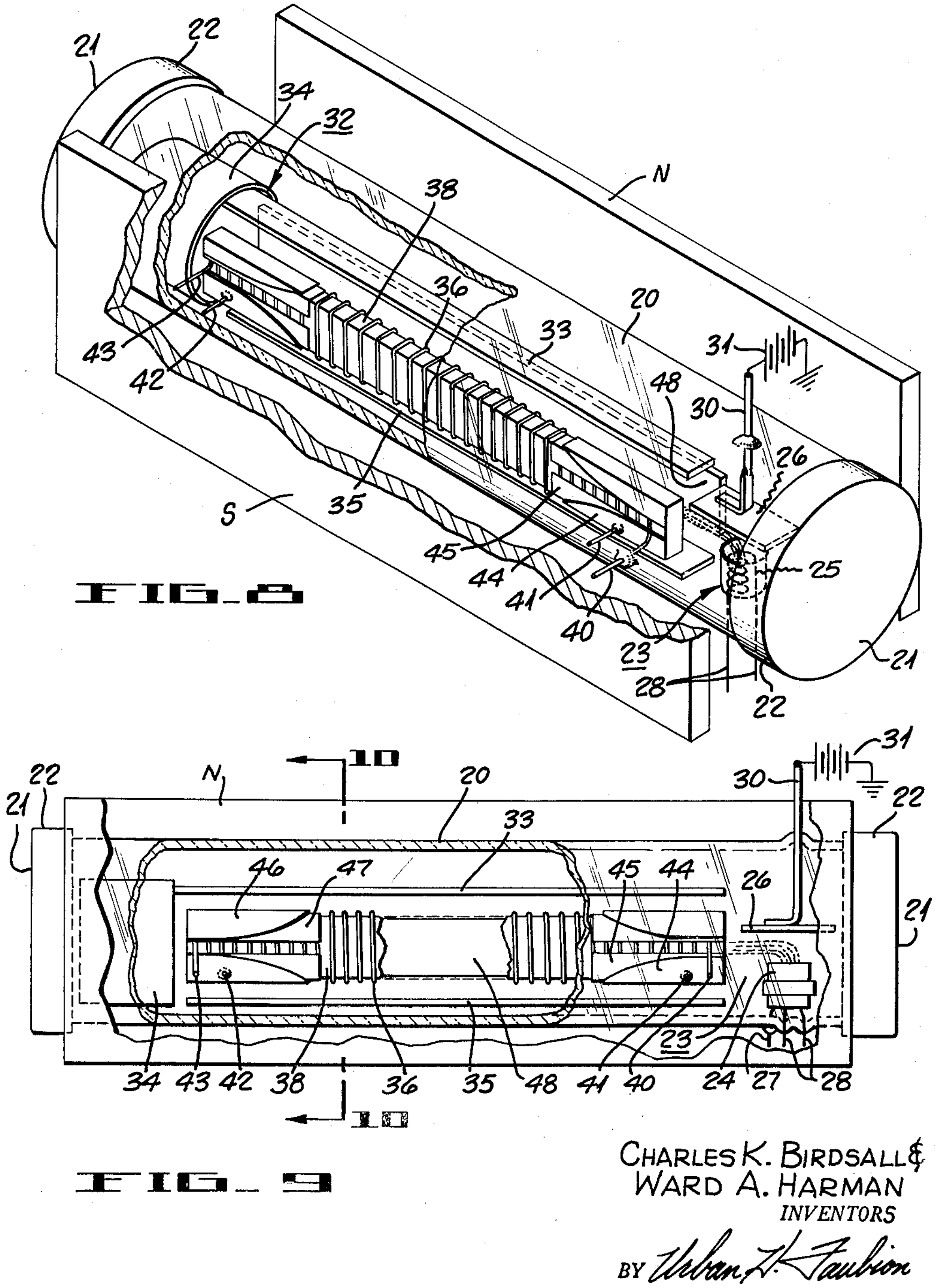
Figure 8 is an isometric view, partly in cross section, of an energy interchange device which was constructed to operate in accordance with the present invention.
Figure 9 is an axial view, partly in cross section of the device of Figure 4.
Figure 10:
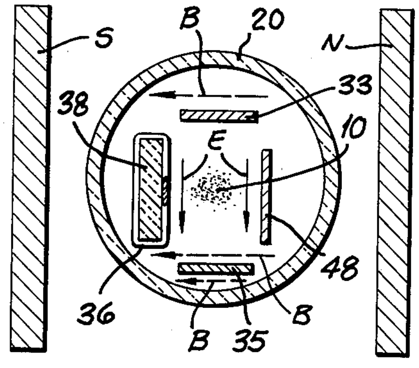
Figure 10 is a cross sectional view of the device of the Figures 8 and 9 taken along section lines 10—10 of Figure 8.

A preferred embodiment of a plane or linear structure constructed in accordance with the present invention is illustrated in Figures 8, 9 and 10. The structure includes a cylindrical envelope or tube 20 which is evacuated and closed at both ends by disc shaped end caps 21. The end caps 21 are provided with cylindrical skirts 22 around their outer periphery which skirts surround opposite ends of the envelope 20. A vacuum tight seal is provided between the end caps 21 and the envelope 20.

The envelope 20 incloses all of the elements of the device which elements correspond exactly to those described in connection with the model of Figure 2. However, the configuration of most of the elements in the tube 20 differs from the corresponding elements of Figure 2 and therefore different reference numerals are given for these elements.

In order to form and direct a stream of electrons down the longitudinal axis of the envelope 20, an electron gun 23 is positioned at one end of the envelope. The electron gun 23 may be any one of a number of conventional type guns but the particular one illustrated includes an electron emissive cathode member 24 of the button type, a filamentary heater element 25 connected to a source of potential (not shown) and a deflector member or electrode 26. The cathode member 24 is of the button type and comprises a disc shaped end member with a cylindrical skirt which extends downwardly and surrounds the heater member 25. The cathode 24 is supported by means of a supporting conductor 27 which extends through the wall of the envelope 20 and serves the dual purpose of supporting the cathode in position and providing a means of establishing the potential of the cathode member 24. The heater member 25 is also provided with support members 28 which extend out through the envelope 20. When the heater conducting supports 28 are connected to a potential source, the electron emissive cathode member 24 is heated and emits a cloud of electrons. The deflector electrode 26, which is supported in position above the face of the electron emissive cathode 24 by means of a conductor support 30, is brought through the wall of the envelope 20 and connected to a unidirectional potential source 31, is so positioned that the cloud of electrons emitted from the cathode 24 is formed into a stream and directed down the envelope 20.

Residual energy in the electron stream, that is energy not used in the interaction process, is dissipated by means of a separate collector anode member 32. The collector member 32 consists of two portions. One part of the collector anode member 32 is a substantially flat, rectangular conductive plate 33 which corresponds to the collector 15 described in connection with previous figures. The second part of the collector anode 32 is a substantially cup-shaped end collector anode 34. The collector plate 33 extends substantially parallel to the axis of the cylinder from a point near the deflector 26 to the opposite (output) end of the envelope 20. The cup-shaped collector 34 is affixed to the end of the plate 33 at the output end of the envelope 20 in such a manner that its open end substantially surrounds the end of the interaction region. Thus, the plate 33 collects electrons which rise out of the interaction region and the cup-shaped member 34 collects those electrons which travel throughout the length of the interaction region without being otherwise intercepted.

An electric field is established in the interaction region which has lines of force E predominantly indicated by the arrows so labeled in Figure 10 by placing a substantially rectangular conducting sole plate 35 in spaced and parallel relation to the collector plate 33. A potential difference is established between the collector plate 33 and sole plate 35 by connecting them to a unidirectional potential source in such a manner that the collector anode plate 33 is positive with respect to the sole plate 35. The conductive leads, which are brought out of the envelope 20 from these electrodes, and the potential source are purposely not shown in order to simplify both the drawings and the description.

It will be noted that the part of the apparatus described thus far corresponds to those elements illustrated and described in connection with Figure 1 of the drawings. The magnetic lines of force B, as indicated in Figure 1, are established by placing a magnet member having north and south poles N and S on diametrically opposite sides of the envelope 20 and in such a position that the lines of force B are substantially parallel to the planes of both the collector plate 33 and sole plate 35 and substantially perpendicular to both the longitudinal axis of the apparatus and the lines of force of the electric field E.

The radio frequency waves are introduced into the interaction region by means of a slow wave structure in the form of a flat-wound wire helix 36 which is wound around an insulating core member 38 and extends over the full length of the interaction region and substantially parallel to the axis of the cylindrical envelope 20. The plane of the flat-wound helix 36 is perpendicular to the planes occupied by both the anode collector plate 33 and the sole plate 35. It should be noted that the slow wave circuit 36 is described as having a plane although the helix itself has some thickness. This notation is used as a matter of convenience since it is felt that this term is descriptive and helps to understand the relationship of the components of the device.

The helical slow wave structure 36 is held in position by means of the input conductors 40 and 41 and the output conductors 42 and 43, all of which are brought through the evacuated envelope 20. In practice, energy is coupled onto the slow wave circuit 36 by connecting input conductor 40 to the center conductor of a coaxial transmission line (not shown) and the other input conductor 41 to the shield or outer conductor of the coaxial transmission line. Input conductor 40 is connected to the wire of the helical slow wave circuit 36 and the opposite input conductor 41 is connected to a conventional impedance matching metallic end piece 44 which is inserted over the input end of the slow wave circuit 36. The metallic end piece 44 provides a good impedance match between relatively low impedance (e.g. 50 ohm) coaxial transmission line and the relatively high impedance (e.g. 300 ohm) slow wave circuit 36. A sheet of insulating material 45 is inserted between the metallic impedance matching end piece 44 and the windings of the slow wave circuit 36 to prevent shorting contact.

The output conductors 42 and 43 are also connected to a coaxial transmission line and subsequently a utilization circuit of some kind. Neither the coaxial transmission line or the utilization circuit are shown. However, the output end of the helical slow wave circuit 36 is connected to the output conductor 43 and ultimately to the center conductor of an output coaxial transmission line. The other output conductor 42 is connected at one end to an impedance matching metallic end piece 46 which is also provided for matching the impedance between the slow wave circuit 36 and the coaxial conductor. Once again it is necessary to insulate the impedance matching end piece 46 from the turns of the slow wave circuit 36 by inserting a sheet of insulating material 47 between the two. The opposite end of output conductor 43 is connected to the shield of an output coaxial transmission line.

A substantially rectangular, elongated, conductive plate member 48, of approximately the same configuration as the sole plate 35, is disposed opposite to and in spaced parallel relation to the slow wave circuit 36. As explained in connection with the corresponding plate 17 of the model illustrated in Figure 2, the conductive plate member 48 acts as one of the side boundaries of the interaction region and serves to aid in the focusing of the electron stream in the sense that it helps to keep the electrons in the interaction region. In order to best accomplish this result, the plate member 48 and slow wave circuit are fixed at a unidirectional potential (the same) which is positive with respect to the sole plate 35 and negative with respect to the collector anode member 32. An example of practical operating potentials is a negative 1000 volts on the sole plate 35, a positive 2000 volts on the collector anode 32, and connect the slow wave circuit 36 and its plate member 48 to approximately ground or reference potential.

A comparison of the apparatus disclosed in Figures 8, 9 and 10 with the model of Figure 2 shows that each of the two devices have corresponding operating components and electrodes and that the relative orientation of the components and the mutually crossed magnetic and electric fields B and E correspond. Therefore, it should be clear that the apparatus disclosed and described in connection with Figures 8, 9 and 10 operates in precisely the same manner as previously described in connection with the simplified model of Figure 2.

Figure 11:
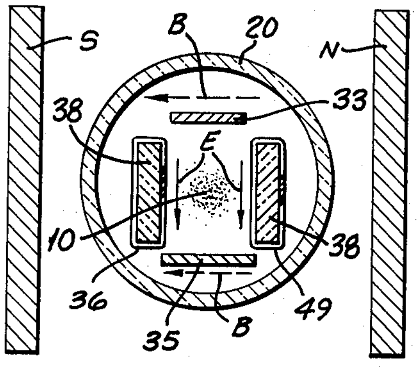
Figure 11 is a cross section view of another embodiment of high frequency energy interchange device which was constructed in accordance with the present invention.
Figure 13:
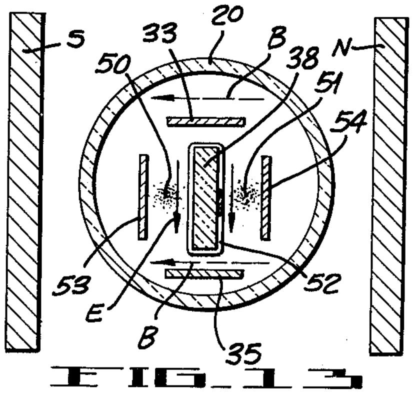
Figures 13 and 14 are cross sectional views of other embodiments of high frequency energy interchange devices constructed to operate utilizing the principles of the present invention.
Figure 12:
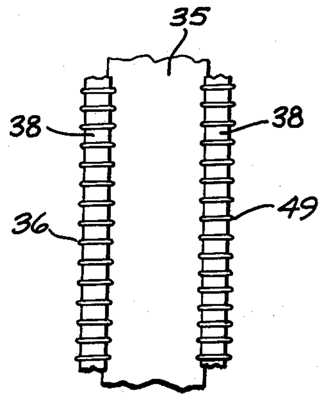
Figure 12 is a partial plan view of the embodiment of the apparatus illustrated in Figure 11.

Other configurations for the various circuit elements may be employed to alter the radio frequency and unidirectional field configurations in a useful manner. In addition, it may be useful to alter the electron stream configurations or to utilize more than one electron stream. Figures 11, 12 and 13 illustrate some of the useful modifications. Note that in these figures, elements which correspond to elements of the apparatus of Figures 8, 9 and 10 are given reference numerals which correspond.

The embodiment of the invention shown in Figure 11 differs from that disclosed in Figures 8, 9 and 10 only in that it utilizes a pair of slow wave circuits instead of the single slow wave circuit 36. The extra or additional slow wave circuit 48 in this apparatus is identical to the slow wave circuit 36 and is disposed in parallel and spaced relation to the slow wave circuit 36 on the opposite side of the interaction region. This slow wave circuit replaces or occupies the position of the plate 48 in the apparatus of Figure 10. By utilizing the two slow wave circuits 36 and 49, a larger surface area is made available in energy exchange relation with the electron stream 10. The basic theory of operation is not altered, however. The two slow wave structures 36 and 49 are preferably coupled in such a manner that the radio frequency waves introduced into the interaction region thereby are approximately 180 degrees out of phase. With this arrangment, the electrons in the single stream 10 midway between the circuits are deflected from one decelerating region to another never experiencing acceleration. Thus the electron stream gives up energy to each of the slow wave circuits 36 and 49 as described in connection with the decelerating phase regions in the model of Figures 2, 6 and 7. Since the electrons are deflected from one decelerating region to another and never experience acceleration, they move rapidly toward the collector 15 with the circuits 36 and 49 alternately abstracting energy from the stream. Figure 12 is a plan view showing the position of the two slow wave circuits 36 and 49 on opposite sides of the interaction region and the sole plate 35 which is below the interaction region.

Desirable results are also obtained when the direction of spiral of the two slow wave circuits 36 and 49 are in opposite senses. In this case, the radio frequency fields introduced in the interaction region by each of the circuits 36 and 49 tend to decelerate or unwind the injected stream thereby to effect an energy transfer in a fashion similar to that described in connection with the decelerating fields above.

It has been found feasable electrically to couple the two circuits so that they produce electromagnetic fields in the interaction region which are in phase. In this case the electrons along the center of the device do not move in the direction of either of the circuits but simply move toward the collector and the electrons on opposite sides of the electron stream move in a manner similar to that described in connection with the single sheet beam 10 traveling down the interaction region in the model of Figure 2. It should be obvious that the best type of stream configuration when utilizing the two slow wave circuits 36 and 49 on opposite sides of the interaction region and operating these circuits in phase is a relatively wide sheet stream. One of the simplest ways to assure that the two circuits 36 and 49 are in phase is to connect the turns of each to the sole or reference plate 35 either along the plate 35 or at intervals therealong.

Still another embodiment of the invention is disclosed in Figure 13. Once again elements of the apparatus which correspond to the devices disclosed in Figures 8, 9, 10, 11 and 12 are given corresponding reference numerals to simplify the present discussion. In this embodiment of the invention, a pair of electron streams 50 and 51, indicated generally by the dotted ovals in Figure 13, are produced and controlled by electron guns (not shown). A slow wave circuit 52 which is constructed in a manner similar to the slow wave circuits 36 and 49 is disposed in the center of the envelope 20 in such a manner that it extends down the length thereof between the collector plate 33 and sole plate 35. A pair of conductive rectangular plate shield members 53 and 54, which are similar to the shield member 48 in Figures 8, 9 and 10, are positioned substantially parallel to each other and on opposite sides of the evacuated envelope 20 with their planes substantially perpendicular to the planes of the collector 33 and sole plate 35. Thus an interaction region is formed on each side of the slow wave structure 52 and each electron stream is directed down one of the interaction regions; i.e., between the slow wave structure 52 and one of the shield plates 53 and 54. Energy is exchanged between each of the electron streams 50 and 51 and radio frequency waves in the same manner described in connection with the single electron stream 10 of Figure 2 and the individual electrons *w*, *x*, *y* and *z* described in connection with Figures 4, 5, 6 and 7.

Figure 14:
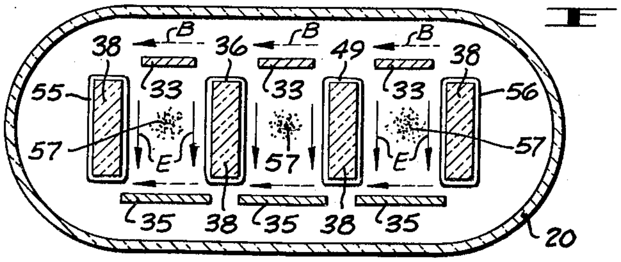

It should also be apparent that a number of the devices may be incorporated in one envelope without departing from the present invention. For example, in Figure 14, additional slow wave circuits 55 and 56 similar to circuits 36 and 49 of Figures 11 and 12 are positioned in the envelope 20 parallel to and spaced from the circuits 36 and 49. A separate sole plate 35 and collector plate 33 is added for each new slow wave circuit in such a manner that they form the upper and lower boundaries of an interaction region. Individual electron streams 57 are directed down the three interaction regions between the slow wave circuits 55, 36, 49 and 56 and interact with the circuits in the manner described above.

While particular embodiments of the invention have been illustrated and described, it will of course be understood that the invention is not limited thereto since many modifications both in the circuit arrangements and in the instrumentalities employed may be made. It is contemplated that the appended claims will cover any such modifications as fall within the true spirit and scope of this invention.

What we claim is new and desire to secure by Letters Patent of the United States is:

1. In a high frequency energy interchange device for producing amplification and oscillation in the microwave frequency spectrum, a first pair of spaced and parallel conductive electrodes defining an elongated interaction region therebetween, means to establish an electric field in said interaction region having lines of force extending between and normal to said electrodes, means to produce a magnetic field in said interaction region having lines of force perpendicular to both the lines of force of said electric field and the length of the interaction region, circuit means disposed on opposite sides of said interaction region and said electrodes and extending substantially the full length thereof whereby the interaction region is enclosed on two sides by said electrodes and on the opposite two sides by said circuit means, said circuit means including at least one radio frequency slow wave transmission line for propagating electromagnetic waves down said interaction region at a velocity less than the velocity of light, and electron gun means for producing and directing a stream of electrons down the interaction region at a velocity greater than the velocity of propagation of the electromagnetic waves therein.

2. A high frequency energy interchange device of the traveling wave type for ultra high frequencies including the combination of a pair of parallel conducting surfaces spaced apart in substantially coextensive relationship defining an interaction region therebetween, means for impressing a unidirectional electromotive force between said surfaces thereby to produce an electric field in said interaction region having lines of force extending between and normal to said surfaces, means for producing a magnetic field in said interaction region of such a magnitude and sense as to cause electrons from said stream to travel down the length of said interaction region, circuit means defining a second pair of substantially parallel surfaces disposed on opposite sides of said interaction region and perpendicular to said first pair of parallel surfaces to propagate a radio frequency electromagnetic wave down said interaction region with a velocity less than the velocity of light, and electron gun means for emitting and directing electrons along the length of said interaction region at a velocity greater than the velocity of propagation of the electromagnetic waves thereby to cause interaction between said electromagnetic waves and electrons from said electron stream.

3. In combination, two pairs of substantially coextensive conducting surfaces, the surfaces of each pair being separated, substantially parallel to each other, and perpendicular to the surfaces of the opposite pair thereby defining an intervening interaction space, conductors connected to one pair of surfaces for impressing a unidirectional electromotive force therebetween to produce an electric field in said interaction region which field is substantially perpendicular to said one pair of surfaces, conductors connected to the other pair of surfaces in order to introduce a radio frequency alternating potential therebetween and propagate radio frequency electromagnetic fields down the interaction region, at least one of said other pair of surfaces constituting a slow wave transmission line whereby said electromagnetic waves are propagated down said interaction region at a velocity less than the speed of light, means to produce a magnetic field in said interaction region having lines of force perpendicular to the lines of force of said electric field and said other pair of conducting surfaces, electron gun means disposed at one end of said interaction region in a direction generally perpendicular to the lines of force of both the electric and magnetic fields at an average velocity greater than the velocity of propagation of the electromagnetic waves in the propagation region in a spiral path seeking the more positive of said first pair of surfaces.

4. A high frequency energy interchange device of the type which depends upon an interchange of energy between an electron stream and electromagnetic waves in a region of mutually perpendicular electric and magnetic fields comprising an elongated slow wave structure constructed to propagate electromagnetic waves at a fraction of the speed of light, input energy coupling means connected to said slow wave structure for introducing radio frequency waves thereon, a reference electrode, an electron collector electrode in spaced parallel relation to said reference electrode, said slow wave structure, said reference electrode, and said electron collector electrode being of approximately equal length and disposed to define an interaction space therebetween for accommodating electromagnetic waves propagated by said slow wave structure, electron gun means forming and directing a stream of electrons down the interaction region at a velocity greater than the velocity of propagation of a component of the electromagnetic wave, means providing a magnetic field having lines of force in a direction parallel to the plane of said collector electrode, separate input electrical conductors connected to said collector electrode and said reference electrode to establish the potential of said electrodes at different levels to produce an electric field having lines of force extending from said referenc electrode to said collector electrode and substantially perpendicular to the path of said electron beam and to the lines of force of said magnetic field, and output energy coupling means connected to said slow wave structure to receive radio frequency energy therefrom.

5. A high frequency energy interchange device of the type which depends upon an interchange of energy between an electron stream and electromagnetic waves in a region of mutually perpendicular electric and magnetic fields, comprising a slow wave structure constructed to propagate electromagnetic waves at a velocity substantially less than the speed of light when carrying radio frequency waves, input energy coupling means connected to said slow wave structure for introducing radio frequency waves thereon, a reference electrode, an electron collector electrode in spaced parallel relation to said reference electrode, a shield member disposed in parallel spaced relation to said slow wave structure, said slow wave structure, said collector electrode, said reference electrode and said shield member being of approximately equal length and disposed to surround an interaction region, magnet means for providing a magnetic field having lines of force in a direction parallel to the plane of said collector electrode, means to develop an electric field between said collector electrode and said reference electrode, and an electron gun means for forcing and directing a stream of electrons down the interaction region at right angles to both said electric and magnetic fields and at a velocity greater than the velocity of propagation of electromagnetic waves.

6. In combination in a high frequency energy interchange device which depends upon an interchange of energy between an electron stream and electromagnetic waves to produce amplification and oscillation in the microwave frequency spectrum comprising a slow wave structure constructed to propagate electromagnetic waves along its length at a fraction of the speed of light, input and output energy coupling means connected to said slow wave structure for introducing and abstracting energy from said slow wave structure, a conductive electron collector anode and a conductive reference electrode spaced apart and substantially parallel, magnet means for providing a magnetic field having lines of force parallel to and between said collector anode and reference electrode, said collector and reference electrodes being established at different potential levels whereby an electric field is developed which extends between them, said slow wave structure positioned between said parallel collector anode and reference electrode and along at least one side thereof whereby an intervening interaction space is defined, and an electron gun for providing a stream of electrons having a velocity greater than the velocity of propagation of the electromagnetic waves and directing said stream through the interaction space defined between said slow wave structure and said anode and reference electrode.

7. An energy interchange device of the type wherein an electron stream is directed through mutually crossed electric and magnetic fields including a slow wave transmission line structure constructed to propagate electromagnetic waves therealong at a velocity less than the speed of light, input and output energy coupling means connected to said slow wave structure for introducing and abstracting radio frequency energy, a conductive reference electrode and a conductive collector anode spaced on opposite sides of said slow wave structure and positioned substantially parallel to each other defining an interaction region therebetween for accommodating electromagnetic waves propagated down said slow wave structure, individual electrical conductor means connected to said collector anode and said reference electrode for establishing an electric field having lines of force extending between and substantially normal to the said electrodes, magnet means providing a magnetic field having lines of force substantially transverse to said transmission line structure and substantially parallel to the plane of said collector anode, and electron gun means for producing a stream of electrons and directing said stream down the interaction region at a velocity greater than the velocity of propagation of the electromagnetic waves.

8. A high frequency energy interchange device of the type wherein electrons interact with electromagnetic waves in the presence of mutually crossed electric and magnetic fields, means providing a plurality of electron streams displaced from and parallel to one another, a slow wave structure disposed between each pair of said electron streams, input and output energy coupling means connected to each slow wave structure for introducing and abstracting radio frequency energy, a pair of parallel spaced apart shield members disposed on opposite sides of said slow wave structure and defining an interaction space for respective ones of said streams, collector anode means for collecting said electron streams extending over one side of each interaction space and occupying a plane substantially perpendicular to the plane of said shield members, means including said collector anode for providing an electric field having lines of force substantially normal to the direction of flow of the electron streams, and means providing a magnetic field having lines of force normal to said slow wave structure and parallel to the surface of said collector anode.

9. A high frequency energy interchange device of the type wherein electron streams interact with mutually crossed electric and magnetic fields in operation including at least a pair of slow wave structures in parallel spaced relation defining an interaction space therebetween, electron gun means for directing a stream of electrons down the interaction space, energy coupling means connected to said slow wave structures introducing and abstracting radio frequency energy, electron stream producing means for directing a stream of electrons down each interaction space, substantially planar reference electrode and a substantially planar collector electrode positioned on opposite sides of each interaction space with their planes normal to the planes of said slow wave structures, means for providing an electric field having lines of force normal to the direction of flow of said electron stream in said interaction regions, and means providing a magnetic field having lines of force substantially parallel to said electrode means.

10. A high frequency energy interchange device of the type wherein electrons interact with electromagnetic waves in the presence of mutually crossed electric and magnetic fields, means providing a plurality of electron streams displaced from and parallel to one another, a slow wave structure disposed between each pair of said electron streams, said slow wave structure being constructed to propagate electromagnetic waves at velocities a fraction of the speed of light and less than the average velocity of electrons in said electron stream, input and output energy coupling means connected to each slow wave structure for introducing and abstracting radio frequency energy, a pair of parallel spaced apart shield members disposed on opposite sides of said slow wave structure and defining an interaction space for respective ones of said streams, collector anode means for collecting said electron streams extending over one side of each interaction space and occupying a plane substantially perpendicular to the plane of said shield members, means including said collector anode for providing an electric field having lines of force substantially normal to the direction of flow of the electron streams, and means providing a magnetic field having lines of force normal to said slow wave structure and parallel to the surface of said collector anode.

11. A high frequency energy interchange device of the type wherein electron streams interact with mutually crossed electric and magnetic fields in operation including at least one pair of slow wave structures in parallel spaced relation defining an interaction space therebetween, means to produce an electron stream between said pair of slow wave structures said slow wave structure being constructed to propagate electromagnetic waves at volocities a fraction of the speed of light and less than the average velocity of electrons in said electron stream, input and output energy coupling means connected to each slow wave structure for introducing and abstracting radio frequency energy, a pair of parallel spaced apart shield members disposed on opposite sides of said slow wave structures and the interaction space defined by said slow wave structures, collector anode means for collecting said electron stream extending over one side of each interaction space and occupying a plane substantially perpendicular to the plane of said shield members, means including said collector anode for providing an electric field having lines of force substantially normal to the direction of the flow of the electron stream, and means providing a magnetic field having lines of force normal to said slow wave structure and parallel to the surface of said collector anode.

12. In a high energy interchange device of the type wherein electron streams interact with electromagnetic waves in the presence of mutually crossed electric and magnetic fields, the combination of a plurality of slow wave structures in parallel spaced relation defining interaction regions therebetween, electron stream producing means for directing an electron stream down each interaction region, energy coupling means connected to said slow wave structures to introduce and abstract radio frequency energy, at least one substantially planar reference electrode extending along one side of said interaction regions and at least one collector electrode means for collecting the electrons in said streams, means providing an electric field having lines of force in each interaction region normal to the direction of flow of said electron streams, and means providing a magnetic field having lines of force substantially parallel to said electrode means.

13. In a high energy interchange device of the type wherein electron streams interact with electromagnetic waves in the presence of mutually crossed electric and magnetic fields, the combination of a plurality of slow wave structures in parallel spaced relation defining interaction regions therebetween, said slow wave structure being constructed to propagate electromagnetic waves at velocities a fraction of the speed of light and less than the average velocity of electrons in said electron stream, electron stream producing means for directing an electron stream down each interaction region, energy coupling means connected to said slow wave structures to introduce and abstract radio frequency energy, at least one substantially planar reference electrode extending along one side of said interaction regions and at least one collector electrode means for collecting the electrons in said streams, means providing an electric field having lines of force in each interaction region normal to the direction of flow of said electron streams, and means providing a magnetic field having lines of force substantially parallel to said electrode means.

14. In a high frequency energy interchange device of the type wherein electron streams interact with electromagnetic waves in a region of mutually crossed electric and magnetic fields, means providing a pair of parallel electron streams displaced from one another, a slow wave structure disposed between each said pair of electron streams and in parallel relation therewith, input energy coupling means connected to said slow wave structure for introducing electromagnetic waves thereon, a pair of spaced apart shield members positioned on opposite sides of said slow wave structure in such a manner that said shields and said slow wave circuit defining an interaction space for each electron stream, a substantially planar collector anode for collecting electrons from said stream disposed on one side of said interaction region, means providing an electric field in the interaction regions having lines of force substantially normal to the plane of said collector anode and the direction of travel of said electron streams, means providing a magnetic field having lines of force normal to said slow wave structure and parallel to the surface of said collector anode, and output energy coupling means coupled to said slow wave structure for abstracting radio frequency energy.

References Cited in the file of this patent

UNITED STATES PATENTS

| | | |
|---|---|---|
| 2,233,779 | Fritz | Mar. 4, 1941 |
| 2,809,320 | Adler | Oct. 8, 1957 |
| 2,833,956 | Reverdin | May 6, 1958 |
| 2,834,915 | Dench | May 13, 1958 |
| 2,849,643 | Mourier | Aug. 26, 1958 |
| 2,865,004 | Dench | Dec. 16, 1958 |